United States Patent
Sawada et al.

(10) Patent No.: US 11,955,140 B2
(45) Date of Patent: Apr. 9, 2024

(54) REDUCING DEVIATION OF READ HEAD POSITION BETWEEN WRITING AND READING IN A MAGNETIC TAPE

(71) Applicant: INTERNATIONAL BUSINESS MACHINES CORPORATION, Armonk, NY (US)

(72) Inventors: Tatsuki Sawada, Matsudo (JP); Tsuyoshi Miyamura, Yokohama (JP); Setsuko Masuda, Toshima-ku (JP); Mitsuhiro Nishida, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 17/647,175

(22) Filed: Jan. 6, 2022

(65) Prior Publication Data

US 2023/0215462 A1 Jul. 6, 2023

(51) Int. Cl.
*G11B 5/56* (2006.01)
*G11B 5/008* (2006.01)
*G11B 19/04* (2006.01)
*G11B 20/18* (2006.01)

(52) U.S. Cl.
CPC ........ *G11B 19/041* (2013.01); *G11B 5/00817* (2013.01); *G11B 5/56* (2013.01); *G11B 2020/183* (2013.01)

(58) Field of Classification Search
None
See application file for complete search history.

(56) References Cited

U.S. PATENT DOCUMENTS

| | | | |
|---|---|---|---|
| 8,643,971 B1 * | 2/2014 | Biskeborn | G11B 5/00891 360/55 |
| 9,129,631 B1 * | 9/2015 | Biskeborn | G11B 5/00813 |
| 9,361,920 B1 | 6/2016 | Zhu | |
| 10,269,378 B1 * | 4/2019 | Miyamura | G11B 20/10009 |
| 10,818,314 B1 * | 10/2020 | Miyamura | G11B 5/00813 |
| 10,818,319 B1 | 10/2020 | Miyamura | |
| 2009/0268339 A1 * | 10/2009 | Trabert | G11B 5/584 360/77.13 |
| 2010/0014189 A1 * | 1/2010 | Masuda | G11B 5/584 |
| 2016/0260449 A1 * | 9/2016 | Ahmad | G11B 5/00813 |
| 2017/0169845 A1 | 6/2017 | Ahmad | |
| 2017/0169846 A1 | 6/2017 | Abe | |

(Continued)

FOREIGN PATENT DOCUMENTS

| | | | | |
|---|---|---|---|---|
| DE | 102016203601 A1 * | 9/2016 | ........ | G11B 20/1201 |
| EP | 0947981 A2 * | 10/1999 | ........... | G11B 5/5504 |
| EP | 2328144 A1 * | 6/2011 | ....... | G11B 20/10009 |

(Continued)

*Primary Examiner* — William J Klimowicz
(74) *Attorney, Agent, or Firm* — Teddi E. Maranzano (57) ABSTRACT

Embodiments of the present invention provide a system, method, and computer program product for offsetting a reading head on a magnetic tape to improve verification. A processor determines a write head width, a read head width, and a track pitch based on determining an LTO standard of the magnetic tape. The processor determines a distance of the reading head from a writing head using the write head width, the read head width, and the track pitch, and causes a tape appliance to relocate the read head on the magnetic tape to the determined distance.

4 Claims, 10 Drawing Sheets

(56) References Cited

U.S. PATENT DOCUMENTS

2019/0198050 A1    6/2019  Tagami
2020/0357430 A1 * 11/2020  Biskeborn .......... G11B 5/00813

FOREIGN PATENT DOCUMENTS

| GB | 2502579 A * | 12/2013 | ......... G11B 5/00813 |
| JP | 03292661 A * | 12/1991 | ........... G11B 19/041 |
| JP | 2010027118 A * | 2/2010 | ............ G11B 5/584 |
| WO | WO-2010016365 A1 * | 2/2010 | ....... G11B 20/10009 |
| WO | WO-2021079218 A1 * | 4/2021 | ........... G11B 19/041 |

* cited by examiner

FIG. 1

Data Band 3
- wrap 3n+0
- wrap 3n+2
- wrap 4n-1
- wrap 3n+3
- wrap 3n+1

Data Band 1
- wrap n+0
- wrap n+2
- wrap 2n-1
- wrap n+3
- wrap n+1

Data Band 0
- wrap 0
- wrap 2
- wrap n-1
- wrap 3
- wrap 1

Data Band 2
- wrap 2n+0
- wrap 2n+2
- wrap 3n-1
- wrap 2n+3
- wrap 2n+1

FIG. 2

Track pitch / head size / density

| | LTO4 | LTO5 | LTO6 | LTO7 | LTO8 |
|---|---|---|---|---|---|
| Track pitch [um] | 11.5 | 8.1 | 4.75 | 2.88 | 1.56 |
| Write head width [um] | 14.3 | 11.5 | 8.1 | 4.75 | 2.85 |
| Read head width [um] | 5.3 | 3.8 | 2.8 | 2.3 | 1.00 |
| Length of 1 Data Set [mm] | 81.66 | 102.98 | 102.98 | 84.02 | 84.02 |
| Size of 1 Data Set [byte] | 1589300 | 2472040 | 2472040 | 5031000 | 5031000 |
| Track | 16 | 16 | 16 | 32 | 32 |
| Space for a byte [um²] | 9.454 | 5.399 | 3.166 | 1.539 | 0.834 |
| Depth for a bit [um] | 0.103 | 0.083 | 0.083 | 0.067 | 0.067 |

Area (width and depth) to
Store a bit on physical tape

Read head width is 1/5 of LTO4 so that only 1/5 data can be loaded to LTO8 head which is insufficient to read

REDUCING DEVIATION OF READ HEAD POSITION BETWEEN WRITING AND READING IN A MAGNETIC TAPE

BACKGROUND

The present invention relates generally to the field of magnetic tape drive, and more particularly to read write head arrangement.

Magnetic tape ("tape") data storage systems are widely used to store digital data. Tape data storage systems provide increased data storage space and longevity, for reduced costs. Modern magnetic tapes are commonly packaged in tape cartridges or cassettes. A tape appliance or a tape drive is a device that performs writing or reading of digital data from the tape.

Digital data may be written on tapes of different lengths and widths. One of the standards that defines tape properties is a LINEAR TAPE OPEN® (LTO®) standard (Linear Tape Open and LTO and all LTO based trademarks and logos are trademarks or registered trademarks of Hewlett Packard Enterprise, IBM and Quantum and/or their affiliates). The LTO® standard defines a raw data capacity, tape partitioning, and speed of reading of uncompressed data. For example, LTO-9 is capable of writing eighteen terabytes of data to a 3396 ft (1035 meter) tape with an average speed of up to 1000 MB/Sec.

Tape partitioning is a creation of one or more regions (data bands) on a magnetic tape so that an operating system may manage the data in each region of the tape separately. One of the partitioning standards that was adopted by the LTO is a Linear Tape File System (LTFS).

SUMMARY

Embodiments of the present invention provide a system, method, and computer program product for offsetting a reading head on a magnetic tape to improve verification. A processor determines a write head width, a read head width, and a track pitch based on determining an LTO standard of the magnetic tape. The processor determines a distance of the reading head from a writing head using the write head width, the read head width, and the track pitch, and causes a tape appliance to relocate the read head on the magnetic tape to the determined distance.

DETAILED DESCRIPTION

Aspects of the present invention, as appreciated by one skilled in the art, may be embodied as a system, method, or computer product. Accordingly, aspects of the present invention may take the form of an embodiment combining software (including firmware, resident software, micro-code, etc.) and hardware aspects all generally be referred to as a "module", "method" or "system." Furthermore, aspects of the present invention may take the form of a computer program product embodied in one or more computer-readable medium(s) having computer-readable program code/instructions embodied thereon including controllers, microcontrollers or computer processing units.

Various aspects of the present invention are described below with reference to flowchart illustrations and/or block diagrams of methods, apparatus (system) and computer program products. Embodiments of the present invention will now be described in detail with reference to the accompanying Figures.

Figure 2:
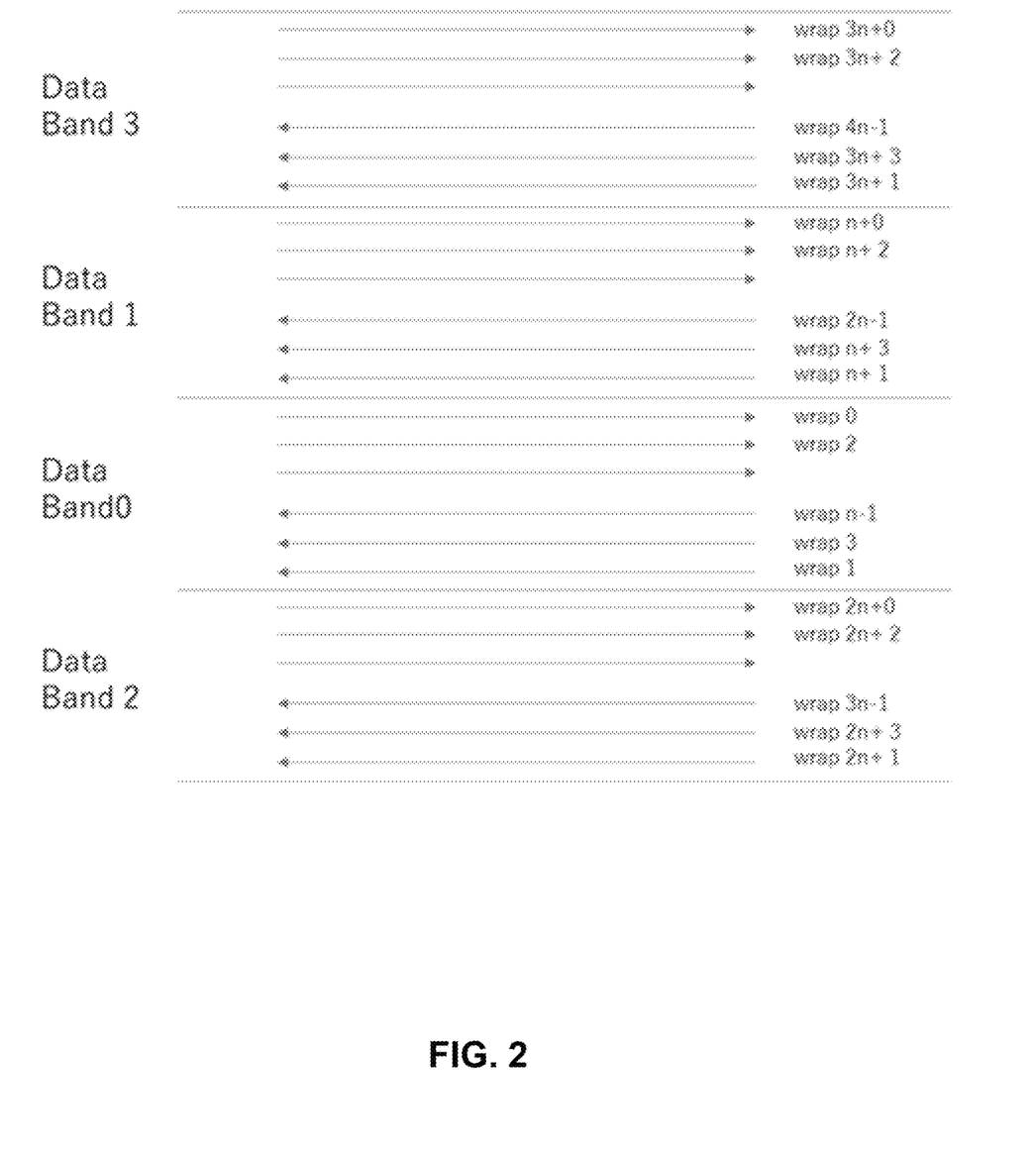
FIG. 2 illustrates an example layout of data tracks on tape medium, in accordance with an embodiment of the present invention.

As previously mentioned, the LTO R standard defines a raw data capacity, tape partitioning, and speed of reading of uncompressed data. For example, LTO-7 is capable of writing six terabytes of data to a 3150 ft (960 meter) tape with an average speed of 300 MB/Sec. According to a linear method that was adopted by the LTO® standard, tape medium is typically divided into four areas called data bands (See FIG. 2). Each data band may be divided into plural wraps in vertical direction (magnetic tape width direction). Typically, the tape drive (tape appliance) writes data linearly from a beginning of magnetic tape (BOT) to an end of the magnetic tape (EOT) in a forward direction on even wraps, and afterwards writes data linearly from EOT to BOT in a backward direction on odd wraps as shown in FIG. 2. The width of each wrap that records valid data linearly is called a track pitch ($W_{TP}$).

Figure 3:
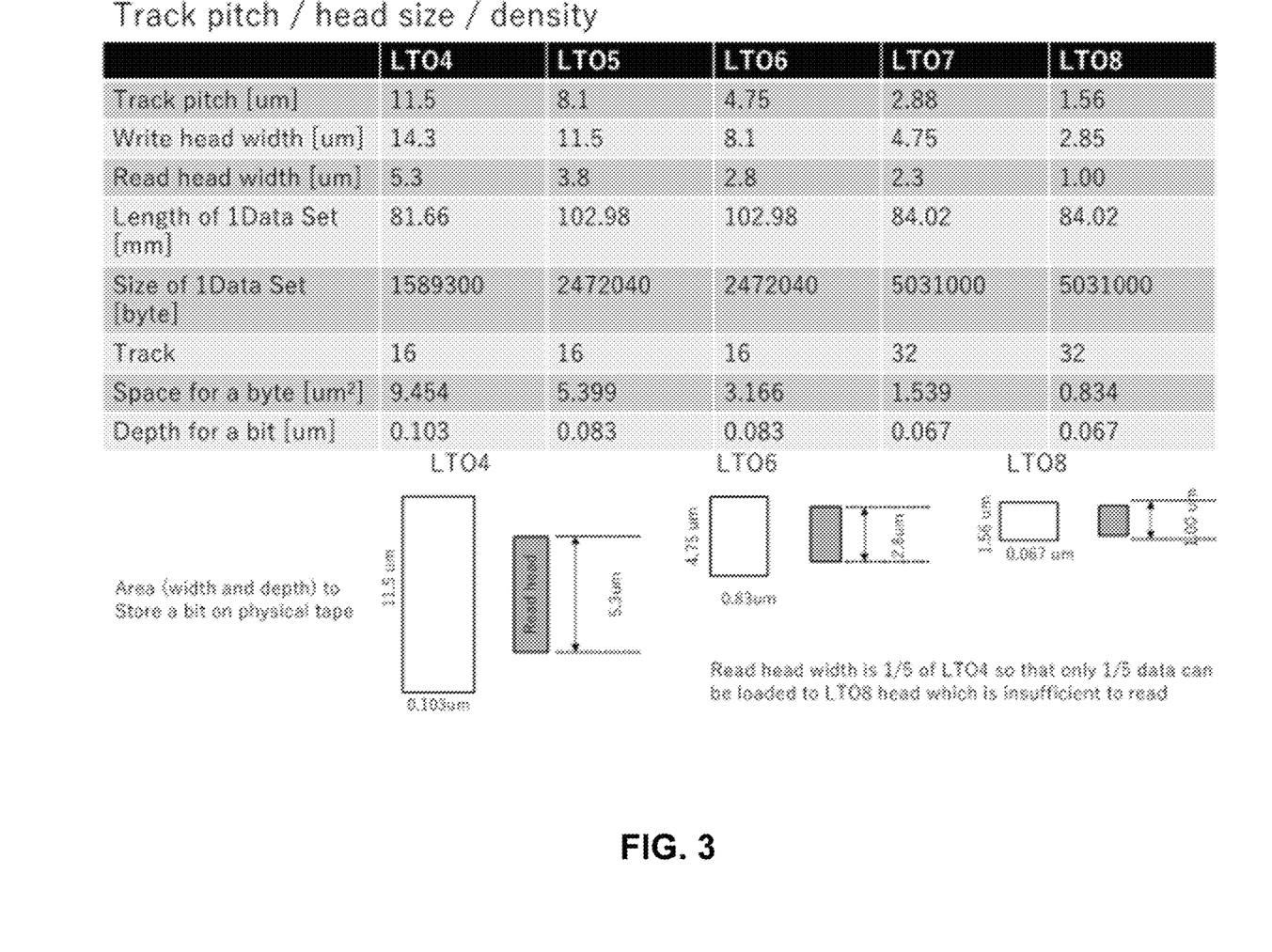
FIG. 3 illustrates a head width and track pitch table for various tape generations, in accordance with an embodiment of the present invention.

With any release of the newer generation of tape drive, the track pitch becomes narrower than in a previous generation tape drives in order to increase the storage of data recorded on the tape medium. Typically, the write head width ($W_{WH}$) is designed as the same width as a track pitch of a previous generation of the tape drive. Maintaining the write head width enables the newer generation tape drive to write data on the previous tape drive generation format. However, the newer generation read head width ($W_{RH}$) is narrower than the track pitch of the data format. The newer drive can still read back the data from a track pitch using narrower read head even though the read head position is shifted by a certain distance in order to reduce the noise. Typical track pitch, read head size, and density of the data on a track is depicted in FIG. 3.

Figure 4A:
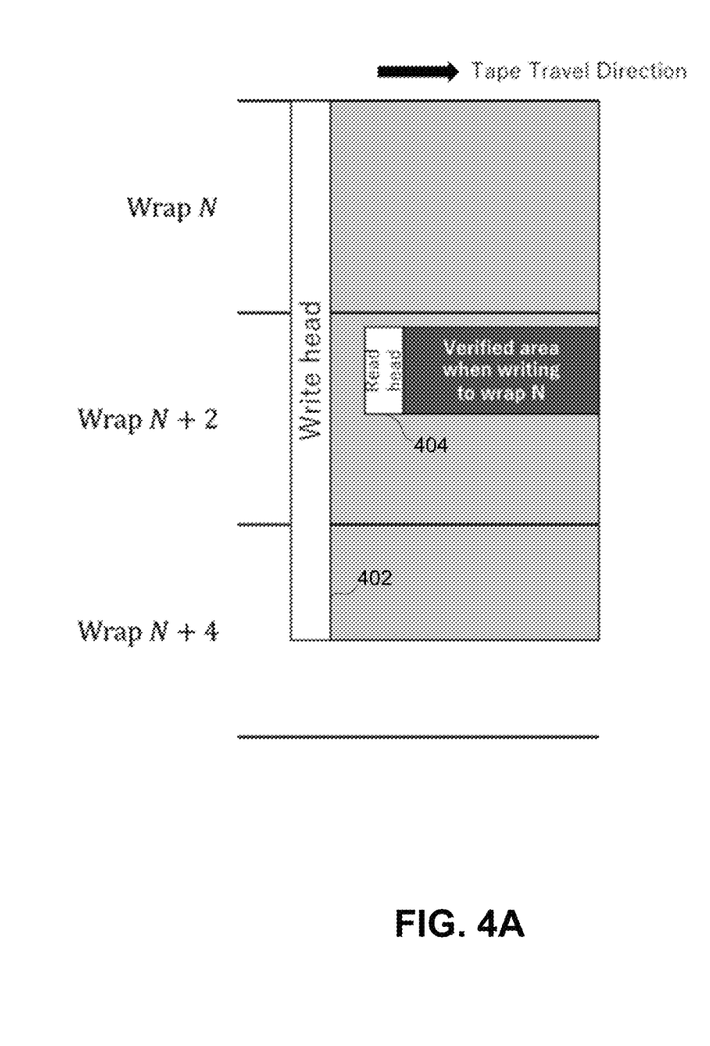
FIG. 4A-4B illustrate an existing write verification method, in accordance with an embodiment of the present invention.

Majority of tape drives that adopted the LTO standard have the Read-While-Write (RWW) function that enables the verification of data during runtime, immediately after it is written by the write head. Currently, the read head is typically located, vertically, in the center relative to the write head, a depicted in FIG. 4A. Thus, due to the write head being significantly larger than the read head, the read head is located outside the track pitch. For example, FIG. 4A depicts writing data to wrap N while the read head is verifying data that is recorded on the wrap N+2 due to the physical location of the read head. Furthermore, when the data is written to the wrap N+2 the write head overwrites the data that was recorded on a part of wrap N+2 while the read head verifies the data on wrap N+4 (See FIG. 4B). Hence, the verified area for the wrap N is only used for read while write and never read back due to location of the read head outside of the wrap during writing of the data.

Frequently, an error where the drive cannot read back the data written by the same tape drive before, is reported by users despite that the verification of the written data was performed by the read head of the tape drive during writing. One of the reasons may be due to a worn magnetic tape or due to degraded tape drive heads. However, one of the major reasons for the error may be that the read head position when the drive writes data on a track is in a different location from the read head position when the drive reads back the data from the track.

Figure 5:
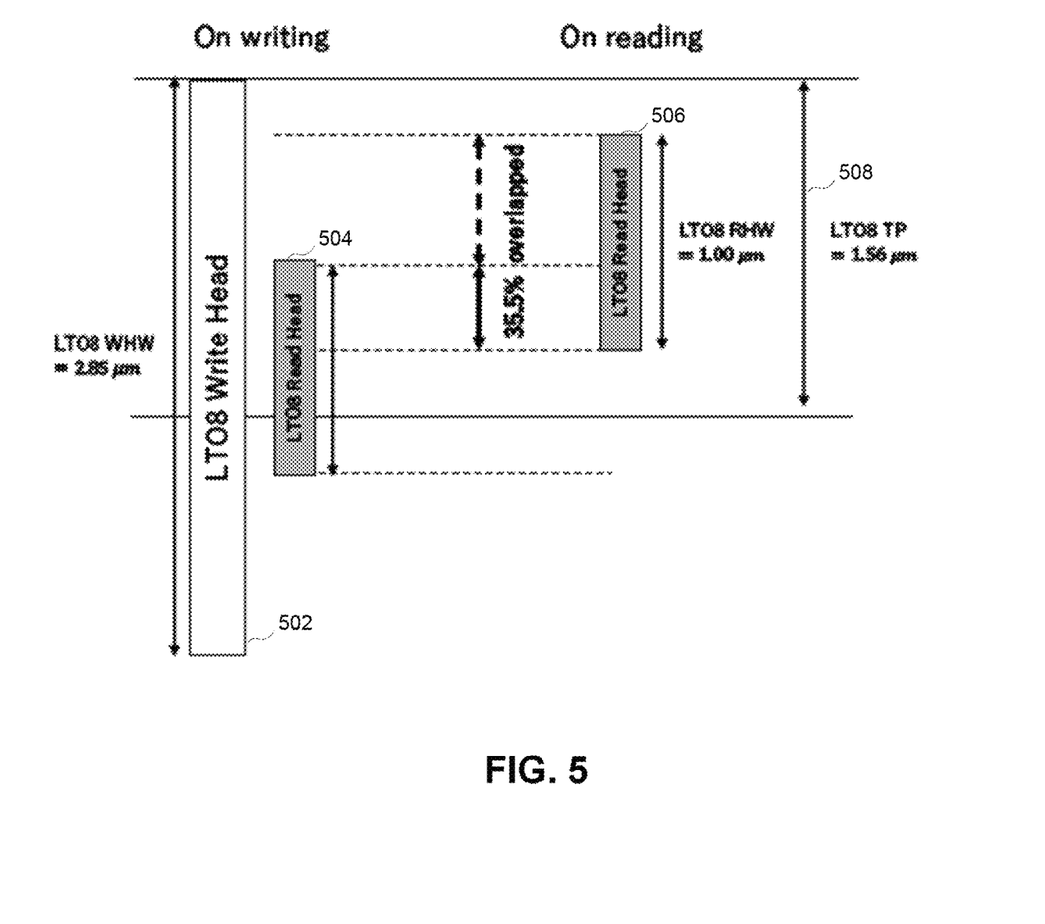
FIG. 5 illustrates a read head location gap during reading and writing verification, in accordance with an embodiment of the present invention.

For example, FIG. 5 schematically depicts the LTO-8 standard read head position between read while write (writing verification) and normal read of the data on the same wrap. The LTO-8 track pitch 508 is typically 1.56 um (micrometer), while write head 502 width is 2.85 um, and read head 504 width is 1.00 um (See table on FIG. 3 for more information). As the read head 502 is positioned at the center of the write head, during read while write operation (data verification) the read head reads back the data from the same position as the center of a write head 502 but this position is out of the track pitch 508. When the tape drive reads back the data from the tape in a normal read operation, the tape drive positions the read head 506 to the center of the track pitch 508. The offset of the read head from the center of the track is 0.645 um and only 35.5% of read head width is overlapped with the range which was verified by the read while write. Furthermore, a part of the read head 504 runs on the neighboring wrap during read while write, that is to be overwritten by the write head when recording data on the next wrap. Therefore, error recovery procedure on reading cannot be executed in the verified area.

Typically, the heads may be relocated vertically on a magnetic tape using a servo engine attached independently to each of the heads. As such, it may be advantageous to, among other things, implement a system that reduces the errors where the drive cannot read back the previously validated data written by the tape drive previously by reducing the deviation between the positions of the read head during writing (writing verification) and reading by shifting the position of the reading head vertically from the center of the writing head so that it does not extend beyond the track width as depicted below.

An embodiment of the present invention, provides a system, a method, and a program product for shifting the position of the reading head vertically from the center of the writing head so that the reading head does not extend beyond the track.

Figure 1:
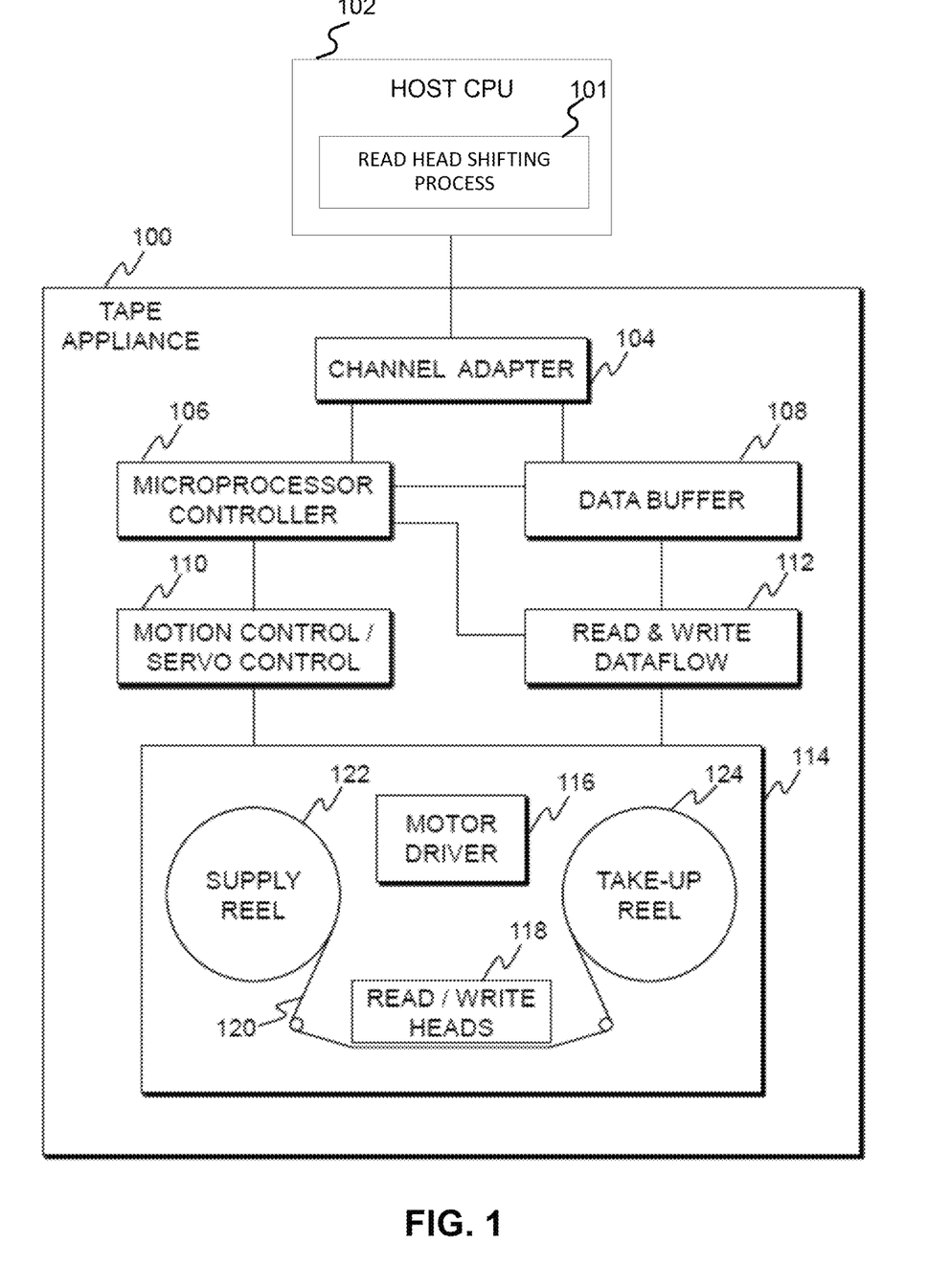
FIG. 1 is a functional block diagram illustrating a tape appliance system, in accordance with an embodiment of the present invention.

FIG. 1 is a functional block diagram illustrating a system for shifting the position of the reading head vertically from the center of the writing head so that the reading head does not extend beyond the track of a magnetic tape. The system may include a tape appliance 100, a host CPU 102 that is connected to the tape appliance 100 and a read head shifting process that may be executed on the host CPU 102 or microprocessor controller 106, in accordance with an embodiment of the present invention.

In an example embodiment, a tape appliance 100 may be a tape drive. Tape appliance 100 may include several components providing control and data transfer system for reading and writing data on magnetic tape medium 120 that was received from host CPU 102.

Tape appliance 100 components may include a channel adapter 104, a computer, such as microprocessor controller 106, a data buffer 108, a read/write data flow circuitry 112, a motion control (servo control) system 110, and a tape interface system 114 that includes a motor driver circuit 116 and read/write unit head 118 that may be repositioned the motion control system 110.

Microprocessor controller 106 provides overall control functionality for the operations of all components of tape appliance 100. The functions performed by microprocessor controller 106 may be programmable via microcode routines according to desired tape drive operational characteristics.

For example, during data write operations, microprocessor controller 106 activates channel adapter 104 to perform the required host interface protocol for receiving an information data block. Channel adapter 104 communicates the data block to the data buffer 108 that stores the data for subsequent read/write processing. Data buffer 108 in turn communicates the data block received from channel adapter 104 to read/write dataflow circuitry 112, which formats the device data into physically formatted data that may be recorded on a magnetic tape medium 120.

A read/write dataflow circuitry 112 is responsible for executing all read/write data transfer operations under the control of microprocessor controller 106. Formatted physical data from read/write dataflow circuitry 112 is communicated to tape interface system 114.

A tape interface system 114 includes one or more read/write modules in read/write head unit 118, and drive motor components (not shown) for performing forward and reverse movement of a magnetic tape medium 120 mounted on a supply reel 122 and a take-up reel 124.

The drive components of tape interface system 114 are controlled by motion control system 110 and motor driver circuit 116 to execute tape movements such as forward and reverse recording and playback, rewind and other tape motion functions.

According to an example embodiment, host CPU 102 may be a controller, a micro-controller, or a computer that receives and sends data to be written or read from magnetic tape medium 120. A host CPU 102 is connected to tape appliance 100 through channel adapter 104 and may run the read head shifting process 101.

Host CPU 102 may be connected to tape appliance 100 by wired, wireless or a network connection. In other embodiments, the network connection may be an intranet, a local area network (LAN), or a wide area network (WAN).

The network may include, for example, wired, wireless (such as Wi-Fi, Bluetooth, or combined) or fiber optic connections. In other embodiments, the network may be implemented as the Internet, representing a worldwide collection of networks and gateways to support communications between devices connected to the Internet or other type of network either wired or wireless which allows the communications between tape appliance 100 and host CPU 102. In general, network may be any combination of connections and protocols that will support communications between tape appliance 100 and host CPU 102.

The read head shifting process 101 is a software program that may be executed on host CPU 102 or microprocessor controller 106 and determine an optimal location of the reading head on a tape in order to reduce reading errors. According to an example embodiment, read head shifting process 101 may identify a write head width, a read head width, and a track pitch based on determining an LTO® standard of the magnetic tape and utilizing the identified data relocate the read head to a location that enables optimal verification of the written data. In another embodiment, the read head location may be set statically based on calculation made by read head shifting process 101, so that the read head position during read while write verification is not located at the center of the write head. Detailed description of read head shifting process 101 operations is described in FIG. 9 below.

FIG. 2 illustrates example layout of data tracks on tape medium, in accordance with an embodiment of the present invention. According to an LTO® standard, every magnetic tape such as magnetic tape medium 120 are physically divided into data bands while each band has wraps that store data where the data is stored and read from various directions depending on the wrap number.

For example, an LTO-7 format, may have 112 wraps allocated to four data bands (data bands 0-3) where each band has 28 wraps, where data band 0 has wraps 0-27, data band 1 has wraps 28-55, data band 2 has wraps 56-83, and data band 3 has wraps 84-111 respectively. All the data wraps may be formatted into a single partition from wrap 0 to wrap 111 or for example, LTFS may divide the tape into two partitions wraps 0-1 that may be used for metadata and wraps 4-111 for data retention associated with the metadata.

FIG. 3 illustrates a head width and track pitch table for various tape generations, in accordance with an embodiment of the present invention. As may be seen from the table, every new LTO® standard is associated with the smaller pitch and smaller read and write heads as depicted in the bottom of each column.

Figure 4B:
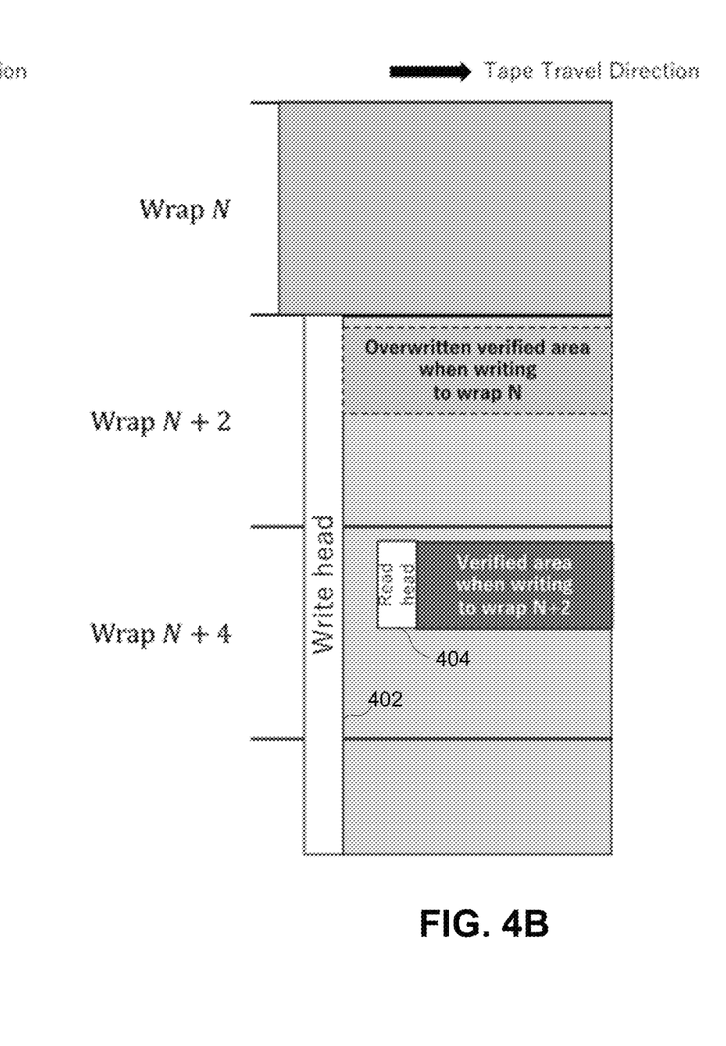

FIG. 4A-4B illustrate an existing write verification method, in accordance with an embodiment of the present invention. As previously mentioned, FIG. 4A depicts a verification process after using a writing head 402 to write data on wrap N while the verification is based on data read by the reading head 404 that is located on a wrap N+2. FIG. 4B depicts a verification process after using a writing head 402 to write data on wrap N+2 while the verification is based on data read by the reading head 404 that is located on a wrap N+4.

FIG. 5 illustrates a read head location gap during reading and writing verification, in accordance with an embodiment of the present invention. As previously mentioned, FIG. 5 depicts the LTO-8 standard read head position between read while write (on writing) and normal read of the data on the same wrap (on reading). The LTO-8 track pitch 508 is typically 1.56 um (micrometer), while write head 502 width is 2.85 um, and read head 504 width is 1.00 um. Because the read head 502 is positioned at the center of the write head, during read while write operation that is located out of the track pitch 508. Contrary, during normal read operation, the tape drive positions the read head 506 in the center of the track pitch 508. Thus there is an offset of the read head from the center of the track is 0.645 um and only 35.5% of read head width is overlapped with the range which was verified by the read while write.

Figure 6:
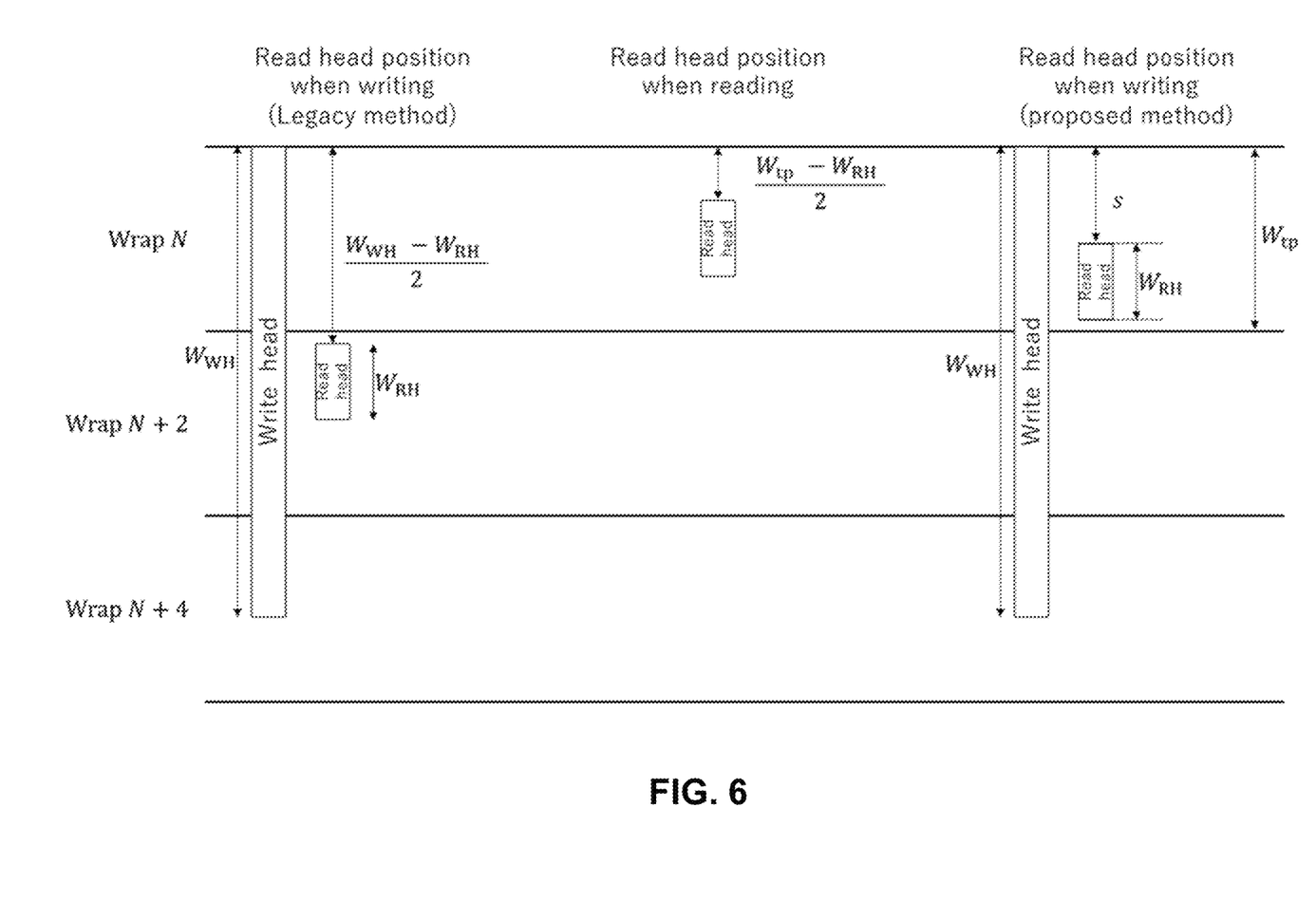
FIG. 6 illustrates an offset method of a read head location, in accordance with an embodiment of the present invention.

FIG. 6 illustrates an offset method of a read head location, in accordance with an embodiment of the present invention. In order to determine an optimal location of the read head during writing we identify as $W_{WH}$ the write head width, $W_{RH}$ the read head width, $W_{tp}$ the track pitch, and s is a desired distance from the write head to an upper end of the read head. Thus, in order to relocate the read head so that the read head is not extended beyond the track pitch the distance s should be determined using the equation:

$$0 < s < W_{tp} - W_{RH} \text{ given that } (W_{RH} < W_{tp}) \qquad \text{Equation 1}$$

In addition, due to the track pitch $W_{tp}$ of a current generation is less than a track pitch $W_{tp\_old}$ of previous generations (i.e., $W_{tp} < W_{tp\_old}$) the equation may be rewritten as:

$$0 < s < W_{tp\_old} - W_{RH} \text{ given that } (W_{RH} < W_{tp_{old}}) \qquad \text{Equation 2}$$

According to the first embodiment, satisfaction of Equation 2 may be performed in addition to Equation 1, thus:

$$\frac{W_{tp} - W_{RH}}{2} - W_{RH} \le s \le \frac{W_{tp} + W_{RH}}{2} \qquad \text{Equation 3}$$

Figure 7:
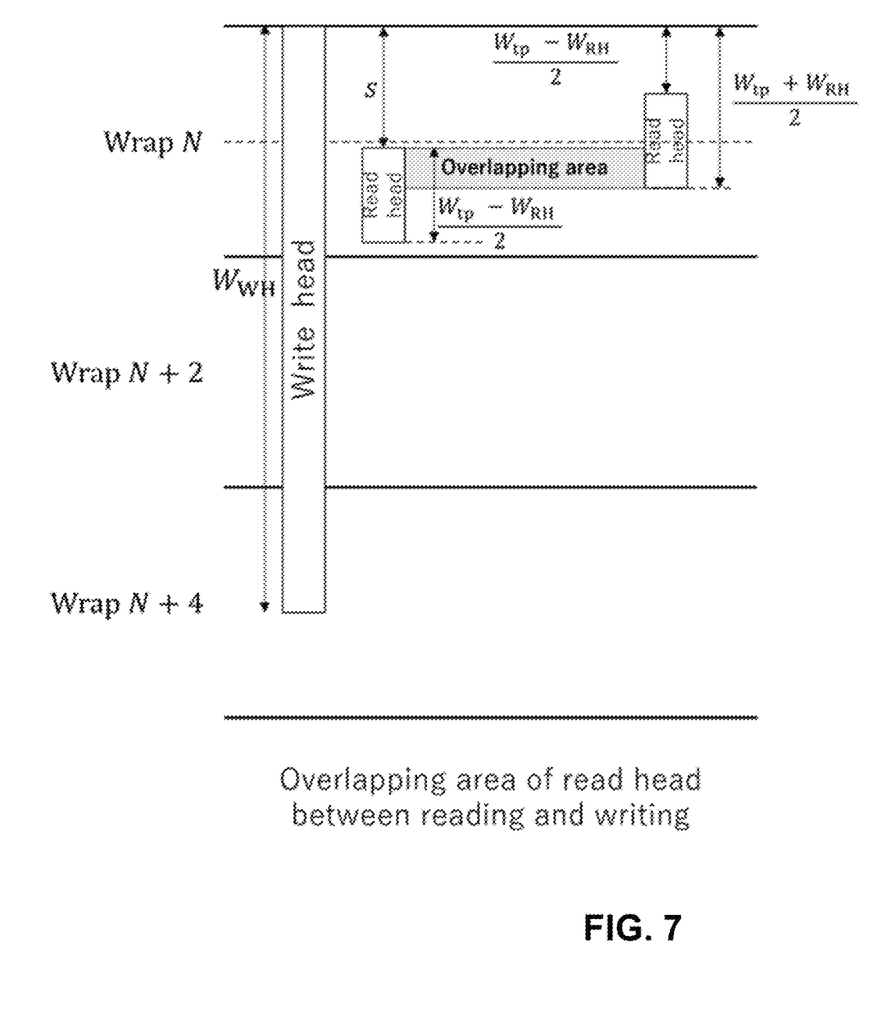
FIG. 7 illustrates an offset method of a read head location, in accordance with an embodiment of the present invention.

This enables a tape appliance to reposition the read head so that the location of the read head during writing overlaps with the position of the reading head during reading, whereby the data may be verified due to overlapping of the head locations during reading and verification as depicted in FIG. 7.

FIG. 7 illustrates an offset method of a read head location, in accordance with an embodiment of the present invention. As previously described, the relocation of the read head to the distance s during verification enables verification in the same wrap (wrap N) while having an overlapping area between the locations of the reading head in writing and normal reading modes, thus increasing the accuracy of verification.

Figure 8A:
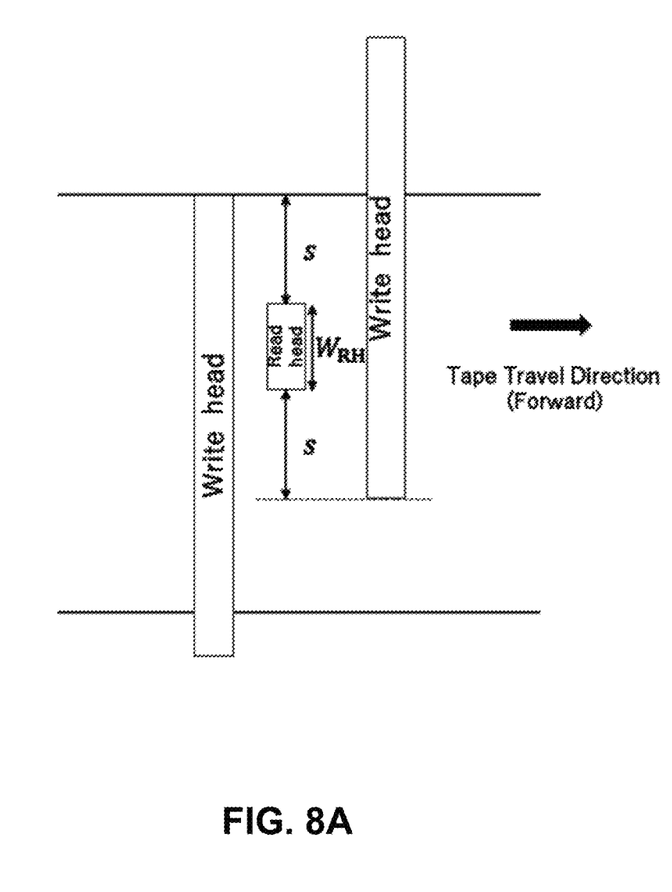
FIG. 8A, 8B illustrate an alternative offset method of a read head location, in accordance with an embodiment of the present invention.
Figure 8B:
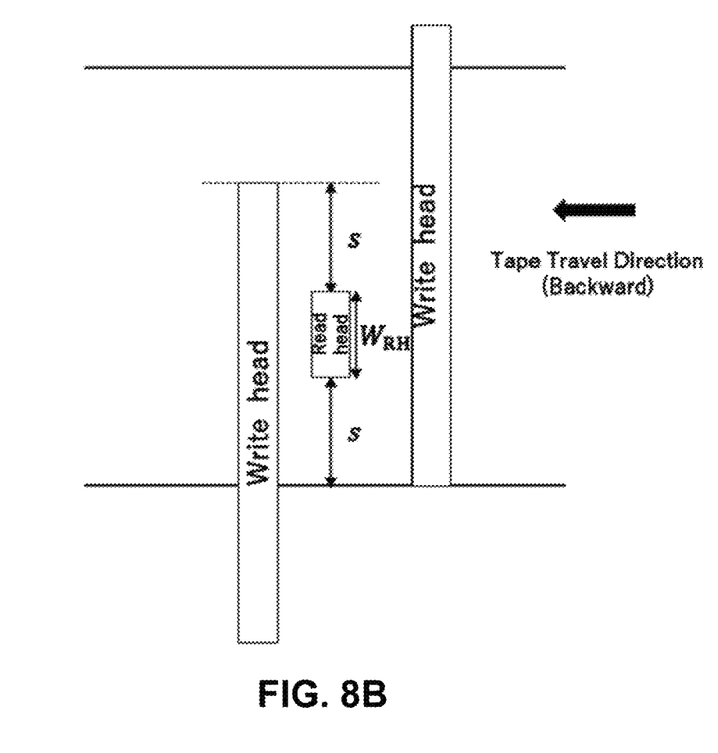

FIG. 8A, 8B illustrate an alternative offset method of a read head location, in accordance with an embodiment of the present invention. According to an alternative embodiment, the write head may be offset to distance s that is symmetrically distanced from the write head that travels in forward and backward directions. By doing so, the write head can correspond to an upper end of a track pitch in either forward or backward travel direction on a tape. Thus, the proposed method in FIGS. 7, 8A, and 8B to offset a location of the read head in writing and reading may improve verification and reduce errors of reading due to increased overlapping between an area already subjected to immediate verification by $R_{WW}$ and an area at the time of reading of the magnetic time later.

Figure 9:
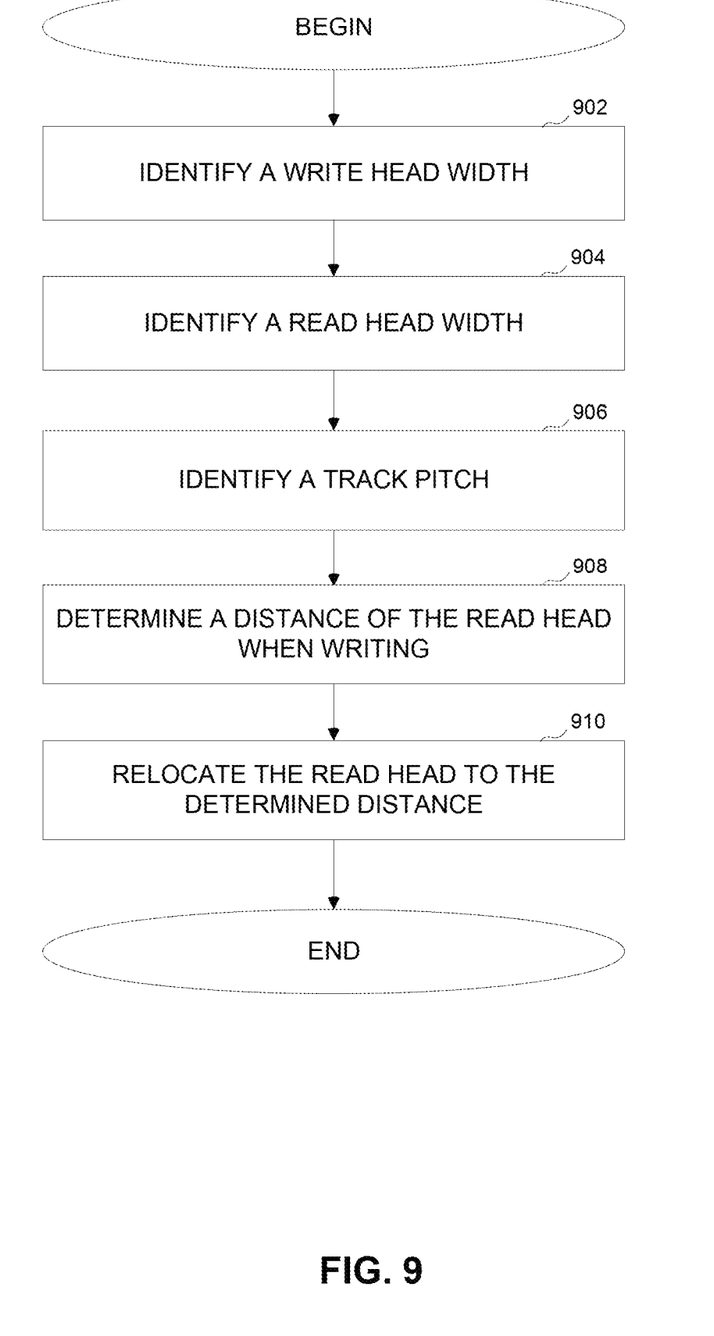
FIG. 9 illustrates a flowchart of a read head shifting process, in accordance with an embodiment of the present invention.

FIG. 9 illustrates a flowchart of a read head shifting process 101, in accordance with an embodiment of the present invention. According to an example embodiment, read head shifting process 101 may be a standalone or integrated software program running on host CPU 102, microprocessor controller 106, or integrated into operating system or device driver of tape appliance 100. In other embodiments read head shifting process 101 may be incorporated into LTFS software. The operations and functions of read head shifting process 101 are described in further detail below with regard to FIG. 9.

At 902, read head shifting process 101 identifies a write head width. According to an example embodiment, read head shifting process 101 may identify an LTO® standard of the tape appliance 100 and then extract a write head width value from a table such as a table of FIG. 3 that may be integrated in read head shifting process 101. The LTO® standard may be determined from the drivers, BIOS, by sampling the magnetic tape or other known method.

Next, at 904, read head shifting process 101 identifies a read head width. As previously mentioned, read head shifting process 101 may identify an LTO® standard of the tape appliance 100 and then extract a read head width value from a table such as a table of FIG. 3.

Then, at 906, read head shifting process 101 identifies a track pitch. As previously mentioned, read head shifting process 101 may identify an LTO® standard of the tape appliance 100 and then extract a track pitch value from a table such as a table of FIG. 3.

Next, at 908, read head shifting process 101 determines a distance of the read head when writing. According to an example embodiment, read head shifting process 101 may determine the distance by calculating a desired distance from the write head to an upper end of the read head s from the write head width $W_{WH}$, the read head width $W_{RH}$, and the track pitch $W_{tp}$, utilizing an equation:

$$\frac{W_{tp} - W_{RH}}{2} - W_{RH} \leq s \leq \frac{W_{tp} + W_{RH}}{2} \qquad \text{Equation 3}$$

In another embodiment, when the values of s fall within a range, read head shifting process 101 may chose the value s that enables a maximum overlapping between the reading head location during verification to the reading head location during normal reading of the same wrap. In further embodiments, the desired distance from the write head to an upper end of the read head s may be set such that the reading head is symmetrically distanced from the write head that travels in forward and backward directions as depicted in FIGS. 8A-8B.

Then, at 910, read head shifting process 101 relocates the read head to the determined distance. According to an example embodiment, read head shifting process 101 may send a command to the motion control (servo control) system 110 to relocate the read head to distance s during verification of the writing of the data to the magnetic tape in order to increase validation efficiency.

Figure 10:
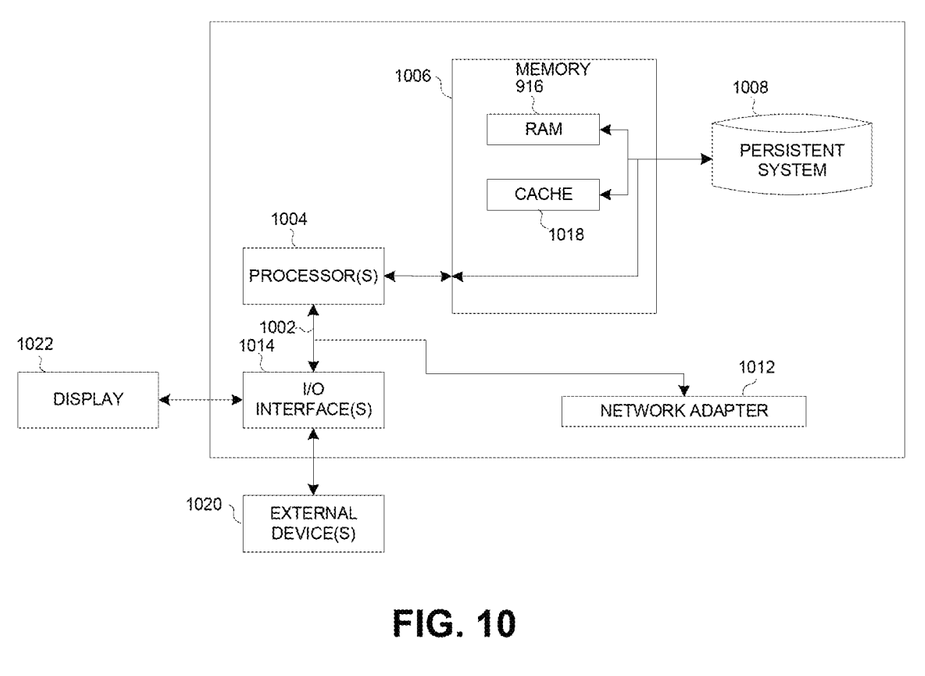
FIG. 10 is a block diagram depicting the example embodiment of hardware components of host CPU 102, and microprocessor controller 106, in accordance with an embodiment of the invention.

FIG. 10 depicts a block diagram of components, such as host CPU 102, microprocessor controller 106 in accordance with an illustrative embodiment of the present invention. It should be appreciated that FIG. 10 provides only an illustration of one implementation and does not imply any limitations with regard to the environments in which different embodiments may be implemented. Many modifications to the depicted environment may be made.

A host CPU 102, and microprocessor controller 106 include communications fabric 1002, which provides communications between computer processor(s) 1004, memory 1006, persistent storage 1008, communications unit 1012, and input/output (I/O) interface(s) 1014. Communications fabric 1002 can be implemented with any architecture designed for passing data and/or control information between processors (such as microprocessors, communications and network processors, etc.), system memory, peripheral devices, and any other hardware components within a system. For example, communications fabric 1002 can be implemented with one or more buses.

Memory 1006 and persistent storage 1008 are computer-readable storage media. In this embodiment, memory 1006 includes random access memory (RAM) 1016 and cache memory 1018. In general, memory 1006 can include any suitable volatile or non-volatile computer-readable storage media.

The read head shifting process 101 may be stored in persistent storage 1008 for execution by one or more of the respective computer processors 1004 via one or more memories of memory 1006. In this embodiment, persistent storage 1008 includes a magnetic hard disk drive. Alternatively, or in addition to a magnetic hard disk drive, persistent storage 1008 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 1008 may also be removable. For example, a removable hard drive may be used for persistent storage 1008. Other examples include optical and magnetic disks, thumb drives, and smart cards that are inserted into a drive for transfer onto another computer-readable storage medium that is also part of persistent storage 1008.

Communications unit 1012, in these examples, provides for communications with other data processing systems or devices. In these examples, communications unit 1012 includes one or more network interface cards. Communications unit 1012 may provide communications through the use of either or both physical and wireless communications links. The read head shifting process 101 may be downloaded to persistent storage 908 through communications unit 1012.

The I/O interface(s) 1014 allows for input and output of data with other devices that may be connected to host CPU 102, or microprocessor controller 106. For example, I/O interface 1014 may provide a connection to external devices 1020 such as a keyboard, keypad, a touch screen, and/or some other suitable input device. External devices 1020 can also include portable computer-readable storage media such as, for example, thumb drives, portable optical or magnetic disks, and memory cards. Software and data used to practice embodiments of the present invention, e.g., read head shifting process 101 may be stored on such portable computer-readable storage media and can be loaded onto persistent storage 1008 via I/O interface(s) 1014. I/O interface(s) 1014 can also connect to a display 1022.

Display 1022 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, a computer-readable storage device, tangible storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for offsetting a read head on a magnetic tape to improve verification, the computer program product comprising:
one or more computer-readable tangible storage medium and program instructions stored on at least one of the one or more tangible storage medium, the program instructions executable by a processor, the program instructions comprising:
program instructions to determine a write head width, a read head width, and a track pitch based on determining an LTO standard of the magnetic tape;
based on determining the LTO standard of the magnetic tape is older than the LTO standard of a tape appliance, program instructions to use an equation $0<s<W_{tp\_old}-W_{RH}$ where s is the distance from a write head to an upper end of the read head, $W_{RH}$ is the read head width, and Wtp_old is the track pitch of the magnetic tape;

program instructions to determine a distance of the read head from the write head using the write head width, the read head width, and the track pitch using an equation $0<s<W_{tp}-W_{RH}$, when $(W_{RH}<W_{tp})$ where s is the distance from the write head to the upper end of the read head, $W_{RH}$ is the read head width, and $W_{tp}$ is the track pitch; and program instructions to cause the tape appliance to relocate the read head on the magnetic tape to the determined distance, such that the read head does not extend beyond the track pitch.

2. The computer program product of claim 1, wherein program instructions to determine the distance of a reading read head from a writing write head is using an equation $$\frac{W_{tp} - W_{RH}}{2} - W_{RH} \le s \le \frac{W_{tp} + W_{RH}}{2},$$

where s is the distance from the writing write head to an upper end of the reading read head, $W_{WH}$ is the writing write head width, $W_{RH}$ is the reading read head width, and $W_{tp}$ is the track pitch.

3. The computer program product of claim 1, wherein program instructions to determine the distance of the read head from the write head is based on the distance that symmetrically distances the read head from the write head that travels in a forward direction and a backward direction.

4. The computer program product of claim 1, wherein program instructions to cause the tape appliance to relocate the read head on the magnetic tape to the determined distance is by program instructions to use a servo engine attached to the read head.

\* \* \* \* \*